(12) United States Patent
Liu et al.

(10) Patent No.: US 11,287,795 B2
(45) Date of Patent: Mar. 29, 2022

(54) SELF-ADAPTIVE COMPENSATION METHOD FOR FEED AXIS THERMAL ERROR

(71) Applicant: DALIAN UNIVERSITY OF TECHNOLOGY, Dalian (CN)

(72) Inventors: Kuo Liu, Dalian (CN); Yongqing Wang, Dalian (CN); Jiakun Wu, Dalian (CN); Haining Liu, Dalian (CN); Mingrui Shen, Dalian (CN); Bo Qin, Dalian (CN); Haibo Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 296 days.

(21) Appl. No.: 16/639,959

(22) PCT Filed: Feb. 21, 2019

(86) PCT No.: PCT/CN2019/075714
§ 371 (c)(1),
(2) Date: Feb. 18, 2020

(87) PCT Pub. No.: WO2020/155229
PCT Pub. Date: Aug. 6, 2020

(65) Prior Publication Data
US 2021/0026319 A1    Jan. 28, 2021

(30) Foreign Application Priority Data
Jan. 31, 2019 (CN) .......................... 201910099610.4

(51) Int. Cl.
*G05B 19/404* (2006.01)

(52) U.S. Cl.
CPC .. *G05B 19/404* (2013.01); *G05B 2219/35015* (2013.01); *G05B 2219/41119* (2013.01)

(58) Field of Classification Search
None
See application file for complete search history.

(56) References Cited

FOREIGN PATENT DOCUMENTS

| CN | 102528558 A | 7/2012 |
|---|---|---|
| CN | 102794671 A | 11/2012 |

(Continued)

OTHER PUBLICATIONS

Office Action dated Nov. 5, 2019 in corresponding CN Application 201910099610.4 with English translation, 7 pages.

*Primary Examiner* — Sean Shechtman
(74) *Attorney, Agent, or Firm* — Muncy, Geissler, Olds & Lowe, PC

(57) ABSTRACT

A self-adaptive compensation method for feed axis thermal error, which belongs to the field of error compensation in NC machine tools. First, based on laser interferometer and temperature sensor, the feed axis thermal error test is carried out; following, the thermal error prediction model, based on the feed axis thermal error mechanism, is established and the thermal characteristic parameters in the model are identified, based on the thermal error test data; next, the parameter identification test is carried out, under the preload state of the nut; next, the adaptive prediction model is established, based on the thermal error prediction model, while the parameters in the measurement model are identified; finally, adaptive compensation of thermal errors is performed, based on the adaptive error prediction model, according to the generated feed axis heat.

1 Claim, 3 Drawing Sheets

(56) References Cited

FOREIGN PATENT DOCUMENTS

| | | | |
|---|---|---|---|
| CN | 106736848 | A | 5/2017 |
| CN | 107065771 | A | 8/2017 |
| CN | 108803484 | A | 11/2018 |
| CN | 109143967 | A | 1/2019 |
| JP | 4358786 | B2 | 11/2009 |
| JP | 2010082724 | A | 4/2010 |

SELF-ADAPTIVE COMPENSATION METHOD FOR FEED AXIS THERMAL ERROR

TECHNICAL FIELD

The present invention belongs to the technical field of error compensation in NC machine tools, and specifically relates to a self-adaptive compensation method for feed axis thermal error.

BACKGROUND

The machine feed shaft of the nut screw drive system generates frictional heat, between the nut and the screw, during operation. Such heat is transferred to the lead screw, causing its thermal expansion. When the feed axis adopts the semi-closed loop control mode, the thermal expansion of the lead screw causes a change in the positioning error of the feed axis. This change is the feed axis thermal error. This error not only causes the machining of a single workpiece to be too poor, but also causes the accuracy consistency of the batch processing to deteriorate. At present, there are two main methods for reducing the influence of feed axis thermal error on machining accuracy:

(1) In case of batch processing, the frequency of workpiece accuracy measurement and the frequency of manual modification of tool compensation are increased. This method is only suitable for the case where the machining path of the tool is simple, such as the external turning of the bar. This method is difficult to apply if the tool trajectory is complicated. In addition, the method reduces processing efficiency and requires more operating strength.

(2) Thermal error compensation method. The method compensates in real time according to the prediction model, without manual intervention and does not affect the machining process of the tool. Based on the analysis of the frictional heat generation, heat conduction and thermal convection mechanism, between the nut and the screw, as described in the patent "Modeling and Compensation Method of Thermal Expansion Error of Semi-closed-Current Axle" (Application No. CN201710310577.6), a temperature field prediction model of the nut-screw pair is established, under the excitation of a time-varying dynamic heat source.

The disadvantage of this method, however, is that the parameters of the prediction model, used for compensation, are based on the state recognition of the machine tool, during modeling. Therefore, after long-term use of the machine tool, some of the thermal characteristics of the model will change, whereas the current model cannot adaptively adjust itself according to these changes, resulting in poor compensation.

SUMMARY

The present invention aims at improving the current situation, where the feed axis thermal error compensation method cannot adaptively compensate for the wear of the machine tool, proposing a self-adaptive compensation method for feed axis thermal error.

The technical solution of the invention:

A self-adaptive compensation method for thermal error of feed shaft, first, a laser interferometer and a temperature sensor is used to perform a feed axis thermal error test, then, a thermal error prediction model is established, based on the heat transfer mechanism, while the thermal characteristic parameter in the thermal error prediction model is identified, based on the thermal error test data; next, the parameter identification test of adaptive thermal error prediction model is carried out under different pre-tightening conditions of the nut; following, the adaptive prediction model is established, identifying its parameters, based on the feed axis thermal error prediction model. Finally, the self-adaptive compensation of the feed axis thermal error is performed, based on the adaptive prediction model.

The steps are as follows:

Step one: Feed axis thermal error test

The temperature sensor (11) is placed on the machine tool bed (9), near the screw; the laser head (1) of the laser interferometer is placed on the ground, through a tripod, while a magnetic stand is used to fix the interference mirror (6), on the main shaft and the reflector (10) on the work table (7).

The process of the thermal test is as follows: first, the full stroke positioning error of the feed axis is tested, under the initial thermal steady state, while the temperature sensor (11) value is recorded; then, the feed axis performs the heat engine movement, within a certain range at a certain feed rate, until the heat balance is established; finally, the feed axis stops at any position to cool down, until it reaches the heat balance state, again. During this process, the feed axis full stroke positioning error is tested at regular intervals (about 10 minutes), while the value of the temperature sensor (11) is recorded.

Step two: The feed axis thermal error prediction model is established.

The screw, between the front bearing (3) and the rear bearing (12), is subdivided into N segments, each length is L. The prediction model of the real-time temperature field of the screw is:

$$T_i(t) = \frac{Q - \left\{ \begin{array}{c} h \times S \times [T_i(t-\Delta t) - T_f(t-\Delta t)] + \lambda \times \\ A \frac{[2 \times T_i(t-\Delta t) - T_{i-1}(t-\Delta t) - T_{i+1}(t-\Delta t)]}{L} \end{array} \right\}}{c \times m} + T_i(t-\Delta t) \qquad (1)$$

Where, $T_i(t)$ is the temperature of the $i_{th}$ segment of the screw at the current moment; Q is the heat generated by the nut, when passing through each segment of the screw; $T_i(t-\Delta t)$ is the temperature of the $i_{th}$ segment of the screw, at the previous moment; $\lambda$ is the heat transfer coefficient; A is the cross-sectional area of the lead screw; $T_{i-1}(t-\Delta t)$ is the temperature of the $(i-1)_{th}$ segment of the screw, at the previous moment; $T_{+1}(t-\Delta t)$ is the temperature of the $(i+1)_{th}$ segment of the screw, at the previous moment; h is the convective heat dissipation coefficient; S is the heat exchange area, between each segment of the screw and the air; $T_f(t-\Delta t)$ is the air temperature, in contact with the surface of the lead screw, at the previous moment; c is the specific heat capacity of the lead screw material; m is the mass of each segment of the lead screw.

The formula for calculating the predicted value $E_s^I(t)$ of the thermal error, at the $i_{th}$ segment of the screw is:

$$E_s^I(t) = \sum_{i=1}^{I} (T_i(t) - T_0) \times L \times k_{coff} \qquad (2)$$

where, $T_0$ is the initial screw temperature and $k_{coff}$ is the thermal expansion coefficient of the screw.

Based on the automated parameter optimization method and the data obtained in the first step, the Q, h and λ thermal characteristic parameters in Eq. (1) are identified, under the constraint condition described in Eq. (3):

$$\min[F(Q, h, \lambda)] = \min\left[\sum_{u=1}^{U}\sum_{v=1}^{V}|E_t(u, v) - E_s(u, v)|\right] \quad (3)$$

$Q_{min} \leq Q \leq Q_{max}$
$h_{min} \leq h \leq h_{max}$
$\lambda_{min} \leq \lambda \leq \lambda_{max}$ where, $E_t(u, v)$ represents the thermal expansion error of the $v_{th}$ test point, in the $u_{th}$ thermal error test, $E_s(u,v)$ represents the expected thermal expansion error of the $v_{th}$ test point, in the $u_{th}$ thermal error test, U is the total number of thermal error tests, V is the number of test points of each test; $Q_{min}$, $h_{min}$ and $\lambda_{min}$ are the lower limit of the parameters Q, h and λ, respectively; $Q_{max}$, $h_{max}$ and $\lambda_{max}$ are the upper limit of the parameters Q, h and λ, respectively.

Step three: The parameter identification test and data processing in the thermal error adaptive compensation model.

In the normal preload state of the nut and in other various preload states (for example, five nut preload states: state 1—normal preload; state 2—preload amount reduced by 10%; state 3—preload amount reduced by 20%; state 4—preload amount increased by 10%; the state 5—preload amount increased by 20%). The following test and data processing is performed:

The test is carried out, under the condition that the M kinds of nuts are preloaded, while the normal preload state is state 1.

(1) Under the initial thermal steady state, the feed axis performs a full-stroke fast-moving motion; while the position and the torque of the servo motor is recorded synchronously, during a period of constant motion.

Based on the position and torque data, the average torque is calculated, during fast-moving motion according to Eq. (4):

$$\overline{M}_j = \frac{1}{K_j}\sum_{k=1}^{K_j} M_j(k) \quad j = 1, 2, \ldots, M \quad (4)$$

where, $\overline{M}_j$ is the average torque of the pre-tightening state of the $j_{th}$ nut; $K_j$ is the number of data collected, under the pre-tightening state of the $j_{th}$ nut; $M_j(k)$ is the $k_{th}$ torque value, collected under the pre-tightening state of the $j_{th}$ nut.

The difference $\Delta\overline{M}_j$ between the average torque of state 2 to state 5 and the average torque of state 1 is calculated as:

$$\Delta\overline{M}_j = \overline{M}_j - \overline{M}_1 \; j=2,3,\ldots M \quad (5)$$

(2) The thermal error and machine tool bed temperature of the feed shaft heat engine is tested, for a certain period of time. Based on the thermal error prediction model and the identified h and λ values, in the second step, the thermal error and bed temperature data are identified, based on the set of thermal error and bed temperature data. According to this group of thermal errors and bed temperature data, the $Q_j$, j=2,3,4,5 as corresponding to the pre-tightening state of the second to the fifth lead screw, are identified; next, the difference between $Q_j$ and the Q, identified in the second step, is calculated as:

$$\Delta Q_j = Q_j - Q \; j=2,3,\ldots, M \quad (6)$$

Step four: An adaptive prediction model for the feed axis thermal error is established.

The relationship between the variation of $\Delta Q$ and the mean torque difference $\Delta\overline{M}$ is:

$$\Delta Q = \alpha \times \Delta\overline{M} + \beta \quad (7)$$

where, α and β are coefficients that, based on the least squares method, are identified, according to the data $\{\Delta Q_j, \overline{M}_j\}$ (j=2,3, ..., M), obtained in the third step.

Step five: The implementation of the feed axis thermal error adaptive compensation.

During the operation of the feed axis, the position of the feed axis, the feed speed and the servo motor torque data are collected and recorded in real time; if there is a continuous R sampling period of uniform velocity motion, according to the feed rate, the following calculations are performed:

(1) the average torque, during the R cycles, is calculated, according as:

$$\overline{M}_s = \frac{1}{R}\sum_{k=1}^{R} M_s(k) \quad (8)$$

where, $\overline{M}_s$ is the average torque for the R cycles and is the value of the $k_{th}$ torque for the R cycles.

(2) It is assumed that, the position interval range of feed axis operation in current R cycles is [P0,P1]; the torque value in the position interval [P0, P1] is extracted from the torque data, acquired in the state 1 of the third step. The average value is calculated, as:

$$\overline{M}_1^P = \frac{1}{K_1^P}\sum_{k=1}^{k_1^P} M_1^P(k) \quad (9)$$

(3) the average torque difference of the current R cycles is calculated, as:

$$\Delta\overline{M}_s = \overline{M}_s - \overline{M}_1^P \quad (10)$$

(4) According to $\Delta\overline{M}_s$, the current $\Delta Q_s$ is calculated, based on Eq. (7), while adaptively the heat, generated by the nut passing through each segment of the screw, is corrected, according to:

$$Q_{new} = Q + \Delta Q_s \quad (11)$$

After applying the correction, the thermal error of the feed axis is predicted adaptively, based on Eqs. (1) and (2), while the numerical control system will adaptively compensate the feed axis, according to the predicted value.

The advantages of the invention is that it can adaptively adjust the thermal characteristic parameters, in the prediction model, according to the current state of the machine tool, while realizing adaptive real-time compensation, so that the machine tool can maintain good machining precision and precision stability, even after long-term wear. The adaptive real-time compensation of the feed axis thermal error reduces the influence of the feed axis thermal error on the machining accuracy and consistency. Under the premise of ensuring the processing precision, the method reduces the time required for workpiece measurement and manual adjustment of the tool compensation, thus improving the processing efficiency and reducing the operation intensity.

Figure 1:
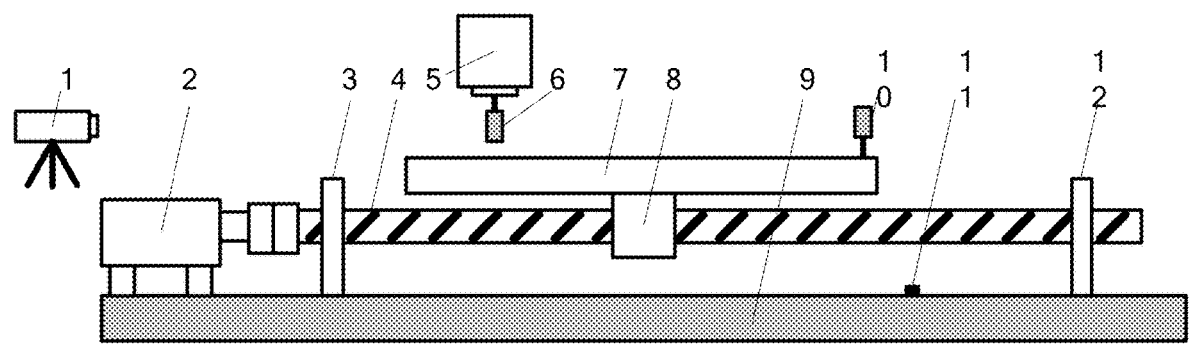
FIG. 1 is a schematic diagram of the feed axis thermal error test and temperature measurement points arrangement.

In Figure: 1—laser head; 2—servo motor; 3—front bearing; 4—screw; 5—spindle; 6—interference mirror; 7—table; 8—nut; 9—bed; 10—mirror; 11—temperature sensor; 12—rear bearing.

DETAILED DESCRIPTION

In order to make the objectives, technical solutions and advantages of the present invention more apparent, the present invention is described in detail below with reference to the accompanying drawings. A specific embodiment of the present invention will be described in detail, considering the X-axis of a vertical machining center as an example.

The basic information of the X axis is:
Semi-closed loop control;
Ball screw drive adaptation;
The front bearing is fixed, the rear bearing is supported, while there is no pre-stretching;
The distance between the front and rear screws is 900 mm;
The fast moving speed is 24 mm/min.

Step one: Feed axis thermal error test

The temperature sensor 11 is placed on the bed 9, near the screw; the laser head 1 of the laser interferometer is placed on the ground, through a tripod, magnetic stands are used to fix the interference mirror 6 on the main shaft and the reflector 10 on the work table 7.

The feed axis thermal error test process is as follows:

First, the positioning error of the feed axis is tested in the range of 10 mm to 710 mm of the machine coordinates, under the initial thermal steady state, while the data of the temperature sensor 11 are recorded, then, the feed axis is moved at a feed rate of 8000 mm/min, while the heat engine is operated in the range of 235 mm to 485 mm, for 60 minutes. Then, the feed axis is halted at a mechanical coordinate position of 10 mm, for a 40-minute cooling. During this process, the positioning error of the feed axis is tested in the range of 10 mm to 710 mm of the machine coordinates, every 10 minutes, while the data of the temperature sensor 11 are recorded.

Step two: The feed axis thermal error prediction model is established.

The lead screw is subdivided, between the front bearing 3 and the rear bearing 12, into 900 segments of 10 mm each. The prediction model of the real-time temperature field of the lead screw is shown in Eqs. (1) and (2). The parameters Q, h and $\lambda$ in the model are identified, according to Eq. (3). The result is: Q=0.86 J, h=12.28 W/(m 2×° C.), $\lambda$=59.4 W/(m×° C.).

Step three: Parameter identification test and data processing in the thermal error adaptive compensation model.

In the preload state of the five nuts, the following tests and data processing are performed, separately. The preload conditions of the five nuts are: state 1—normal preload; state 2—preload is reduced by 10%; state 3—preload is reduced by 20%; state 4—preload is increased by 10%; state 5—preload amount is increased by 20%.

(1) Under the initial thermal steady state, the feed axis performs a full stroke rapid motion. The position and servo motor torque are recorded simultaneously, at a sampling frequency of 1000 Hz, in the uniform velocity section of the motion.

Based on the position and torque data, the average torque, at the constant speed rapid motion, is calculated, according to Eq. (4). The difference between the average torque of state 2 to state 5 and the average torque of state 1 is calculated, according to Eq. (5).

(2) The feed axis is operated at a feed speed of 8000 mm/min, for 20 min, in the range of 235 mm to 485 mm of the machine coordinates, while the positioning error, in the range of 10 mm to 710 mm, is recorded, before and after the test of the thermal machine and the data of the temperature sensor 11 are collected. Based on the thermal error prediction model, established in the second step, the identified h and $\lambda$, the Q, corresponding to the second to fifth pre-tightening states of the lead screw, is identified, based on the thermal error and the bed temperature data of the group.

Step four: An adaptive prediction model for the feed axis thermal error is established.

The relationship between the amount of change in Q and the mean torque difference is shown in Eq. (7). Based on the least squares method, the coefficients $\alpha$ and $\beta$ in Eq. (7) are identified, based on the data obtained in the third step, producing the result: $\alpha$=0.76 J/Nm, $\beta$=0.01 J.

Step five: The feed axis thermal error adaptive compensation implementation

During the operation of the feed axis, the position of the feed axis is acquired, as well as the feed speed and the servo motor torque are recorded, in real time. If there is a rapid uniform motion of 10 consecutive sampling periods, according to the feed speed, the process is as follows:

(1) The average torque $\overline{M}_s$ of 10 cycles is calculated, according to Eq. (8).

(2) The position interval of the 10 cycle feed axis operation is set to [P0, P1]. The torque value $M_1^P(k)$, k=1,2,...,$K_1^P$ in the position interval [P0, P1], is derived from the torque data, as acquired at the state 1 in the third step. The average value $\overline{M}_1^P$ of $M_1^P$ is calculated, according to Eq. (9).

(3) The average torque difference $\Delta\overline{M}_s$ of the current 10 cycles is calculated, according to Eq. (10).

(4) According to $\Delta\overline{M}_s$, the current $\Delta Q_s$ is calculated, based on Eq. (7), while the heat $Q_{new}$, generated by the nut passing through each of the lead screws, is adaptively corrected according to Eq. (11).

Figure 2:
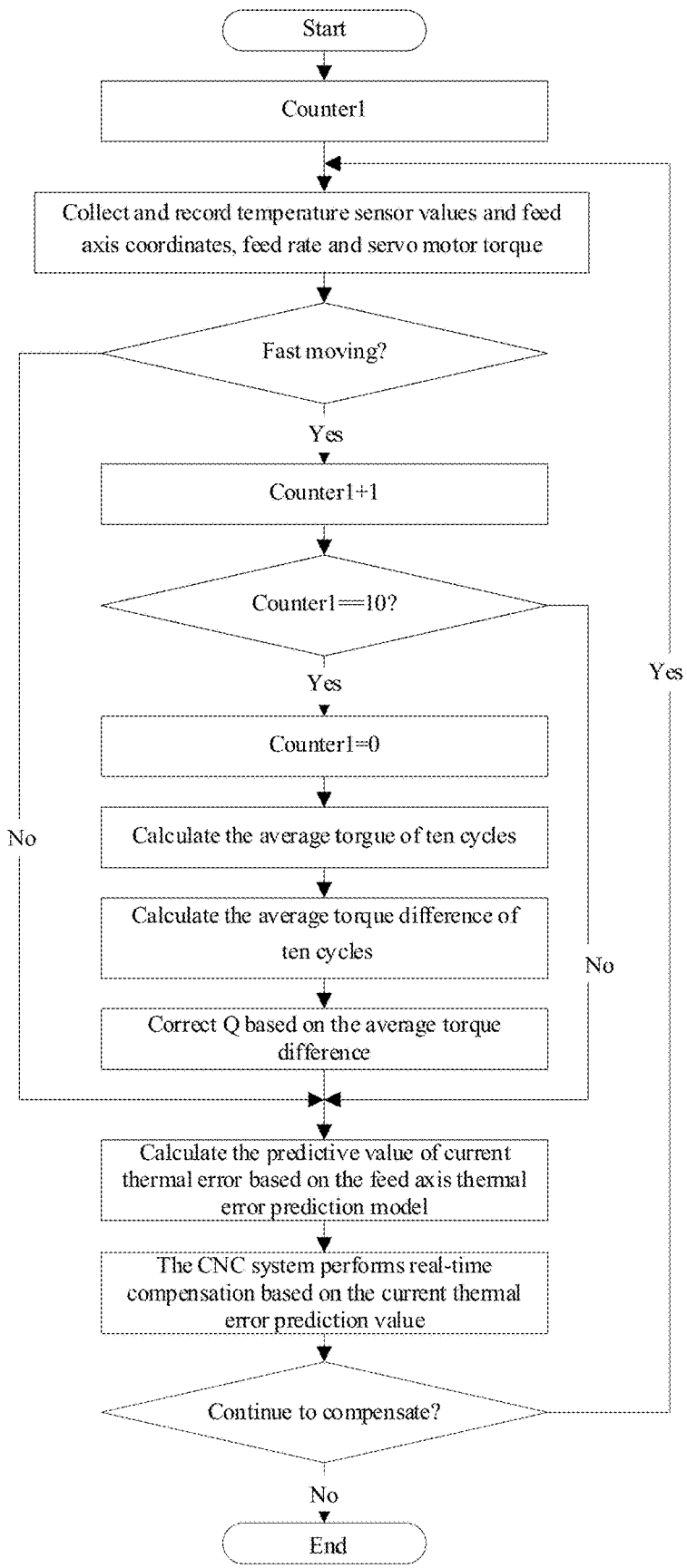
FIG. 2 is a flow chart of the feed axis thermal error adaptive compensation.

Next, the feed axis thermal error is adaptively predicted, based on Eqs. (1) and (2). Based on the FOCAS II protocol, the predicted value is transmitted to the FANUC 0iMD numerical control system, where the adaptive real-time compensation of the feed axis is realized, through the extended mechanical coordinates origin offset function. The specific process is shown in FIG. 2.

Figure 3A:
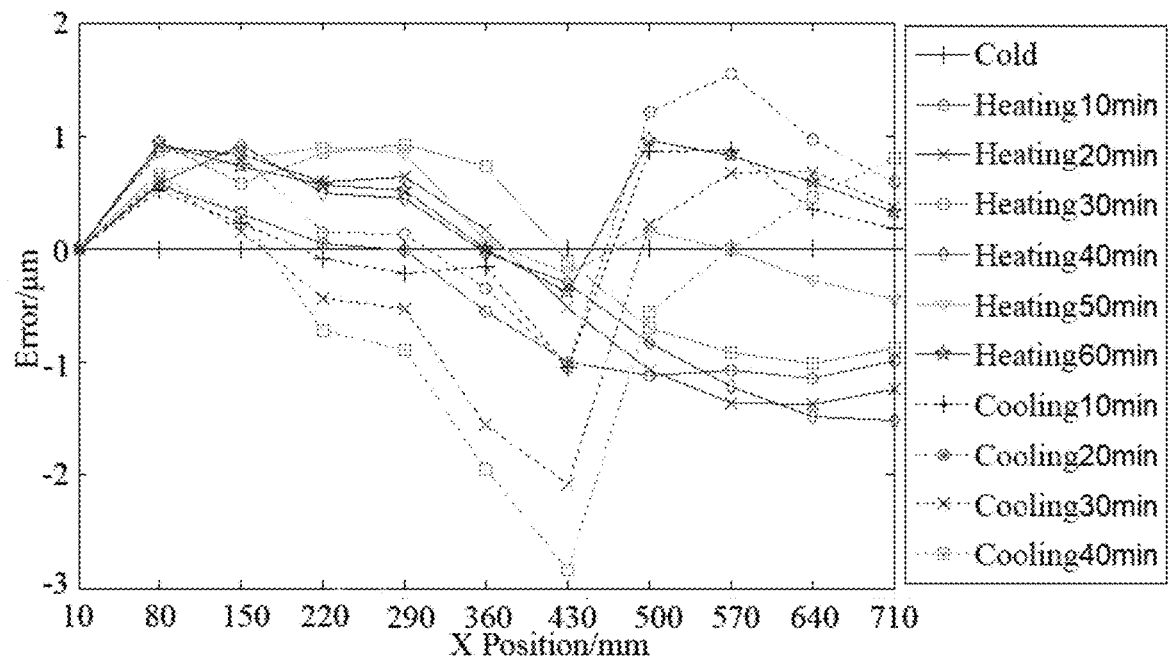
FIG. 3(a) shows the thermal error, after compensation, using the disclosed method.
Figure 3B:
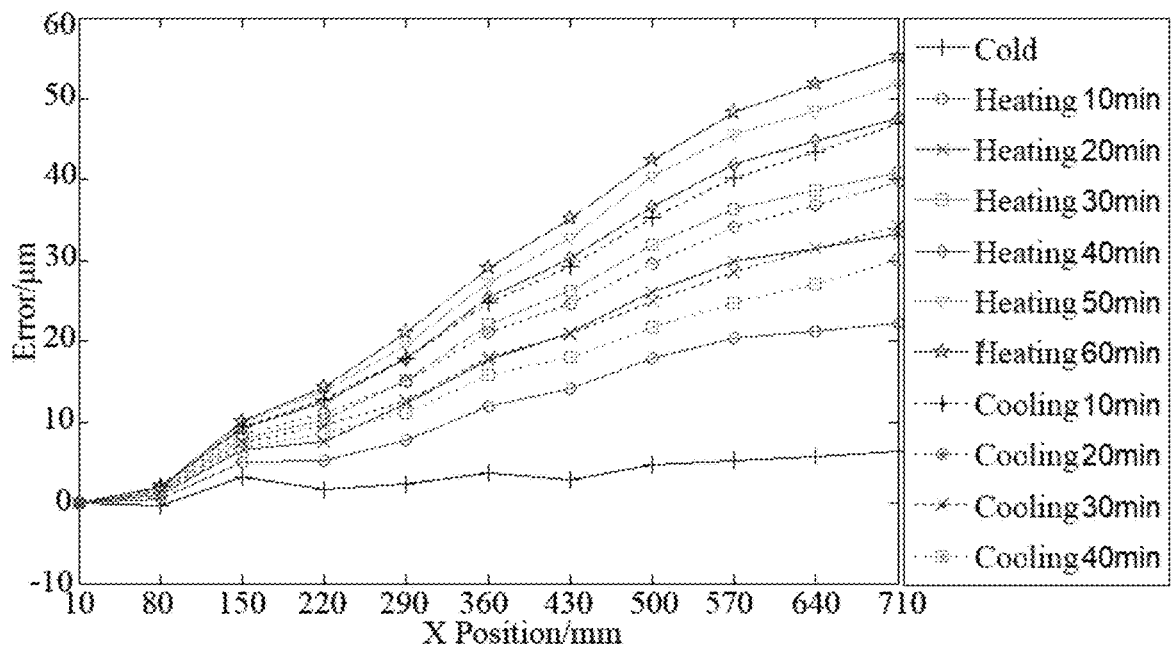
FIG. 3(b) shows the thermal error that was not compensated, using this method.

FIG. 3(a) and FIG. 3(b) are comparison diagrams, before and after adaptive compensation on the X-axis, according to the disclosed method. FIG. 3(a) shows the thermal error after compensation, using the disclosed method, while FIG. 3(b) shows the thermal error, without compensation.

The invention claimed is:

1. A self-adaptive compensation method for feed axis thermal error, wherein, first, based on laser interferometer and temperature sensor, a feed axis thermal error test is carried out; following, a thermal error prediction model, based on a feed axis thermal error mechanism, is established and the thermal characteristic parameters in the model are identified, based on the thermal error test data; next, a parameter identification test is carried out, under a preload state of a nut; next, an adaptive prediction model is established, based on the thermal error prediction model, while the parameters in the measurement model are identified; finally, self-adaptive compensation of thermal errors is performed, based on the adaptive error prediction model, according to a generated feed axis heat; the steps are as follows:

step one: feed axis thermal error test the temperature sensor (11) is placed on a machine tool bed (9), near a screw; a laser head (1) of the laser interferometer is placed on the ground, through a tripod, while a magnetic stand is used to fix an interference mirror (6), on a main shaft and a reflector (10) on a work table (7);

the process of the thermal test is as follows: first, a full stroke positioning error of the feed axis is tested, under an initial thermal steady state, while the temperature sensor (11) value is recorded; then, the feed axis performs a heat engine movement, within a certain range at a certain feed rate, until the heat balance is established; finally, the feed axis stops at any position to cool down, until it reaches the heat balance state, again; during this process, the feed axis full stroke positioning error is tested at regular intervals, while the value of the temperature sensor (11) is recorded;

step two: the feed axis thermal error prediction model is established the screw, between a front bearing (3) and a rear bearing (12), is subdivided into N segments, each length is L; the prediction model of the real-time temperature field of the screw is:

$$T_i(t) = \frac{Q - \left\{ \begin{array}{c} h \times S \times [T_i(t-\Delta t) - T_f(t-\Delta t)] + \lambda \times \\ A \frac{[2 \times T_i(t-\Delta t) - T_{i-1}(t-\Delta t) - T_{i+1}(t-\Delta t)]}{L} \end{array} \right\}}{c \times m} + T_i(t-\Delta t) \quad (1)$$

where, $T_i(t)$ is the temperature of the $i_{th}$ segment of the screw at the current moment; Q is the heat generated by the nut, when passing through each segment of the screw; $T_i(t-\Delta t)$ is the temperature of the $i_{th}$ segment of the screw, at the previous moment; $\lambda$ is the heat transfer coefficient; A is the cross-sectional area of the lead screw; $T_{i-1}(t-\Delta t)$ is the temperature of the $(i-1)_{th}$ segment of the screw, at the previous moment; $T_{i+1}(t-\Delta t)$ is the temperature of the $(i+1)_{th}$ segment of the screw, at the previous moment; h is the convective heat dissipation coefficient; S is the heat exchange area, between each segment of the screw and the air; $T_f(t-\Delta t)$ is the air temperature, in contact with the surface of the lead screw, at the previous moment; c is the specific heat capacity of the lead screw material; m is the mass of each segment of the lead screw;

the formula for calculating the predicted value $E_s^I(t)$ of the thermal error, at the $i_{th}$ segment of the screw is:

$$E_s^I(t) = \sum_{i=1}^{I} (T_i(t) - T_0) \times L \times k_{coff} \quad (2)$$

where, $T_0$ is the initial screw temperature and $k_{coff}$ is the thermal expansion coefficient of the screw;

based on the automated parameter optimization method and the data obtained in the first step, the Q, h and $\lambda$ thermal characteristic parameters in Eq. (1) are identified, under the constraint condition described in Eq. (3);

$$\min[F(Q, h, \lambda)] = \min\left[\sum_{u=1}^{U} \sum_{v=1}^{V} |E_t(u, v) - E_s(u, v)|\right] \quad (3)$$

$Q_{min} \leq Q \leq Q_{max}$
$h_{min} \leq h \leq h_{max}$
$\lambda_{min} \leq \lambda \leq \lambda_{max}$ where, $E_t(u, v)$ represents the thermal expansion error of the $v_{th}$ test point, in the $u_{th}$ thermal error test, $E_s(u, v)$ represents the expected thermal expansion error of the $v_{th}$ test point, in the $u_{th}$ thermal error test, U is the total number of thermal error tests, V is the number of test points of each test; $Q_{min}$, $h_{min}$ and $\lambda_{min}$ are the lower limit of the parameters Q, h and $\lambda$, respectively; $Q_{max}$, $h_{max}$ and $\lambda_{max}$ are the upper limit of the parameters Q, h and $\lambda$, respectively;

step three: the parameter identification test and data processing in the thermal error adaptive compensation model five nut preload states: state 1—normal preload; state 2—preload amount reduced by 10%; state 3—preload amount reduced by 20%; state 4—preload amount increased by 10%; the state 5—preload amount increased by 20%; the following test and data processing is performed under the five states:

the test is carried out, under the condition that the M kinds of nuts are preloaded, while the normal preload state is state 1;

(1) under the initial thermal steady state, the feed axis performs a full-stroke fast-moving motion; while the position and the torque of the servo motor is recorded synchronously, during a period of constant motion;

based on the position and torque data, the average torque is calculated, during fast-moving motion according to Eq. (4):

$$\overline{M}_j = \frac{1}{K_j} \sum_{k=1}^{K_j} M_j(k) \quad j = 1, 2, \ldots, M \quad (4)$$

where, $\overline{M}_j$ is the average torque of the pre-tightening state of the $j_{th}$ nut; $K_j$ is the number of data collected, under the pre-tightening state of the $j_{th}$ nut; $M_j(k)$ is the $k_{th}$ torque value, collected under the pre-tightening state of the $j_{th}$ nut;

the difference $\Delta \overline{M}_j$ between the average torque of state 2 to state 5 and the average torque of state 1 is calculated as:

$$\Delta \overline{M}_j = \overline{M}_j - \overline{M}_1 \quad j=2,3,\ldots M \quad (5)$$

(2) the thermal error and machine tool bed temperature of the feed shaft heat engine is tested, for a certain period of time; based on the thermal error prediction model and the identified h and $\lambda$ values, in the second step, the thermal error and bed temperature data are identified, based on the set of thermal error and bed temperature data; according to this group of thermal errors and bed temperature data, the $Q_j$, j=2,3,4,5 as corresponding to the pre-tightening state of the second to the fifth lead screw, are identified; next, the difference between $Q_j$ and the Q, identified in the second step, is calculated as:

$$\Delta Q_j = Q_j - Q \quad j=2,3,\ldots,M \quad (6)$$

step four: an self-adaptive prediction model for the feed axis thermal error is established the relationship between the variation of $\Delta Q$ and the mean torque difference $\Delta \overline{M}$ is:

$$\Delta Q = \alpha \times \Delta \overline{M} + \beta \quad (7)$$

where, $\alpha$ and $\beta$ are coefficients that, based on the least squares method, are identified, according to the data $\{\Delta Q_j, \overline{M}_j\}$ (j=2,3, ..., M), obtained in the third step;

step five: the implementation of the feed axis thermal error adaptive compensation during the operation of the feed axis, the position of the feed axis, the feed speed and the servo motor torque data are collected and recorded in real time; if there is a continuous R sampling period of uniform velocity motion, according to the feed rate, the following calculations are performed:

(1) the average torque, during the R cycles, is calculated, according as:

$$\overline{M}_s = \frac{1}{R}\sum_{k=1}^{R} M_s(k) \quad (8)$$

where, $\overline{M}_s$ is the average torque for the R cycles and is the value of the $k_{th}$ torque for the R cycles;

(2) it is assumed that, the position interval range of feed axis operation in current R cycles is [P0,P1]; the torque value in the position interval [P0, P1] is extracted from the torque data, acquired in the state 1 of the third step; the average value is calculated, as:

$$\overline{M}_1^P = \frac{1}{K_1^P}\sum_{k=1}^{k_1^P} M_1^P(k) \quad (9)$$

(3) the average torque difference of the current R cycles is calculated, as:

$$\Delta \overline{M}_s = \overline{M}_s - \overline{M}_1^P \quad (10)$$

(4) according to $\Delta \overline{M}_s$, the current $\Delta Q_s$ is calculated, based on Eq. (7), while adaptively the heat, generated by the nut passing through each segment of the screw, is corrected, according to:

$$Q_{new} = Q + \Delta Q_s \quad (11)$$

after applying the correction, the thermal error of the feed axis is predicted adaptively, based on Eqs. (1) and (2), while the numerical control system will adaptively compensate the feed axis, according to the predicted value.

* * * * *